United States Patent [19]
Furuta et al.

[11] Patent Number: 5,523,865
[45] Date of Patent: Jun. 4, 1996

[54] LIQUID-CRYSTAL DISPLAY TOP GATE THIN FILM TRANSISTOR WITH PARTICULAR CONNECTION BETWEEN THE DRAIN AND THE DISPLAY ELECTRODE

[75] Inventors: Mamoru Furuta; Tetsuya Kawamura; Shigeki Maegawa, all of Osaka; Yutaka Miyata, Nara, all of Japan

[73] Assignee: Matsushita Electric Industrial Co., Ltd., Osaka, Japan

[21] Appl. No.: 319,048

[22] Filed: Oct. 6, 1994

[30] Foreign Application Priority Data

Oct. 6, 1993 [JP] Japan ................... 5-250680

[51] Int. Cl.⁶ .................... G02F 1/136; G02F 1/1333
[52] U.S. Cl. ........................... 359/59; 359/79
[58] Field of Search .................. 359/59, 79, 54, 359/87

[56] References Cited

U.S. PATENT DOCUMENTS

| | | | |
|---|---|---|---|
| 5,317,433 | 5/1994 | Miyawaki et al. | 359/59 |
| 5,403,756 | 4/1995 | Yoshinouchi et al. | 437/24 |
| 5,414,278 | 5/1995 | Kobayashi et al. | 257/72 |

FOREIGN PATENT DOCUMENTS 5-158069  6/1993  Japan .
5-206462  8/1993  Japan .

*Primary Examiner*—Anita Pellman Gross
*Assistant Examiner*—Walter J. Malinowski
*Attorney, Agent, or Firm*—Willian Brinks Hofer Gilson & Lione

[57] ABSTRACT

The present invention relates to a thinfilm transistor array designed to drive an active-matrix type liquid-crystal panel to be incorporated in a liquid-crystal display device, and is to offer a thinfilm transistor array solving the conventional problems of disconnections possible between the display electrodes and the drain electrodes and short-circuits possible between the display electrodes and the data wiring. By these, high-quality images can be displayed with a high reliability can be obtained together with an improved fabrication process thereof. In order to accomplish these objectives of the invention, the display electrodes of said thinfilm transistor array are disposed between the gate insulation layer and the inter-insulation layer, and the display electrodes are connected to the drain electrodes by means of a data wiring disposed through contact holes provided through the inter-insulation layer. Furthermore, the possibility of short-circuits can be minimized by insulating and isolating the display electrodes from the data wiring by means of inter-insulation layers, so that the distance between the data wiring and the display electrode can minimized and a remarkable improvement of the displayed image quality can be obtained.

1 Claim, 9 Drawing Sheets

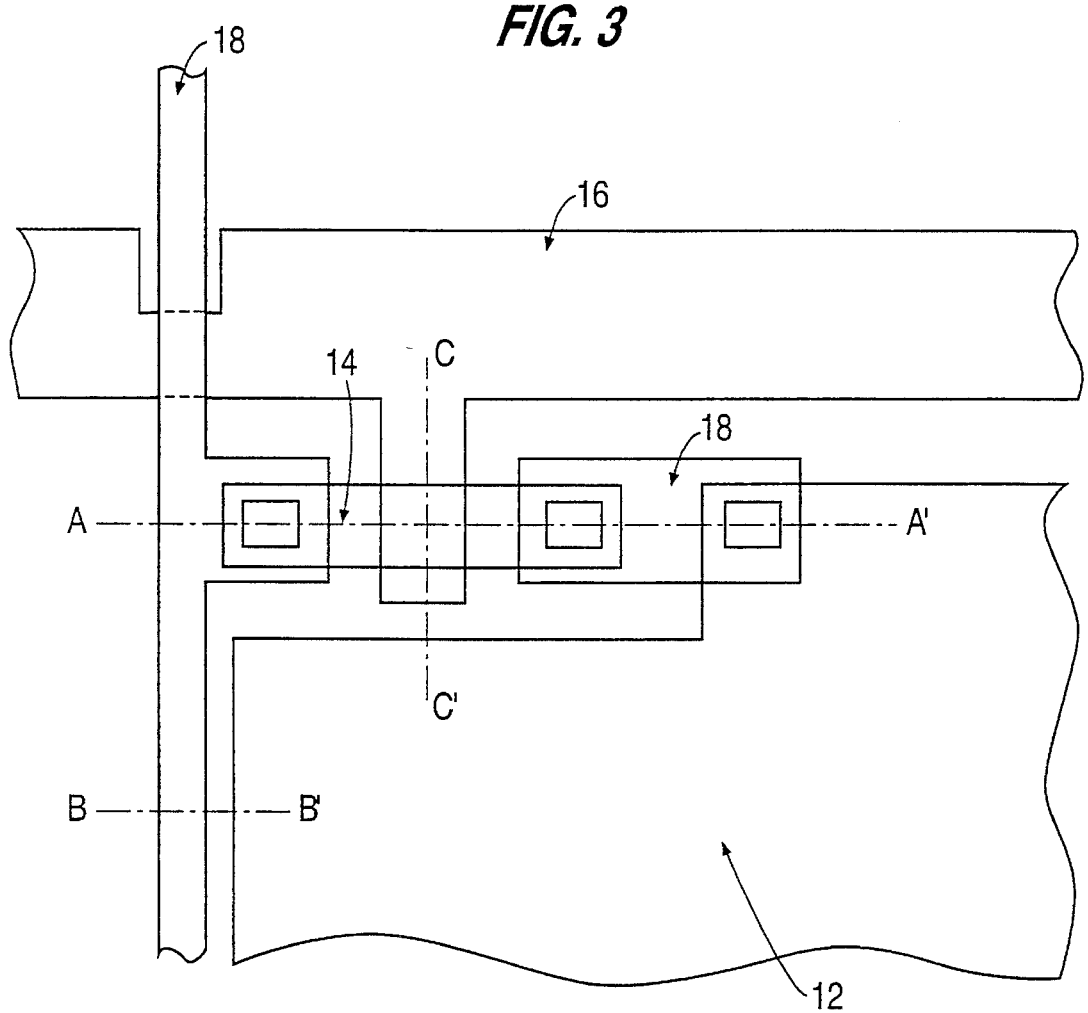

FIG. 7(a) *PRIOR ART*
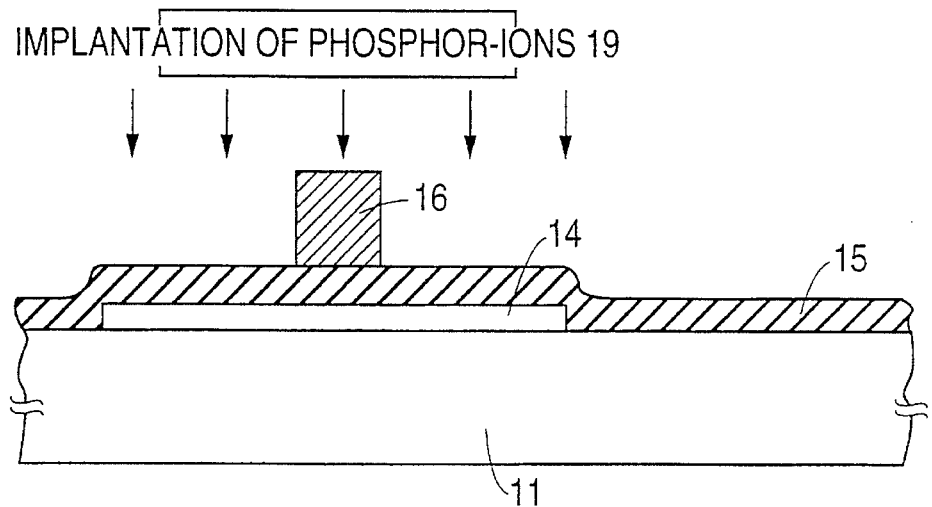
FIG. 7(b) *PRIOR ART*
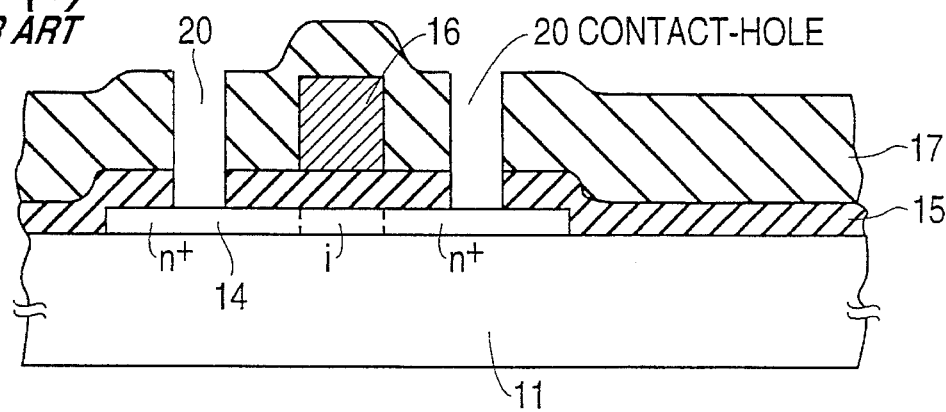
FIG. 7(c) *PRIOR ART*
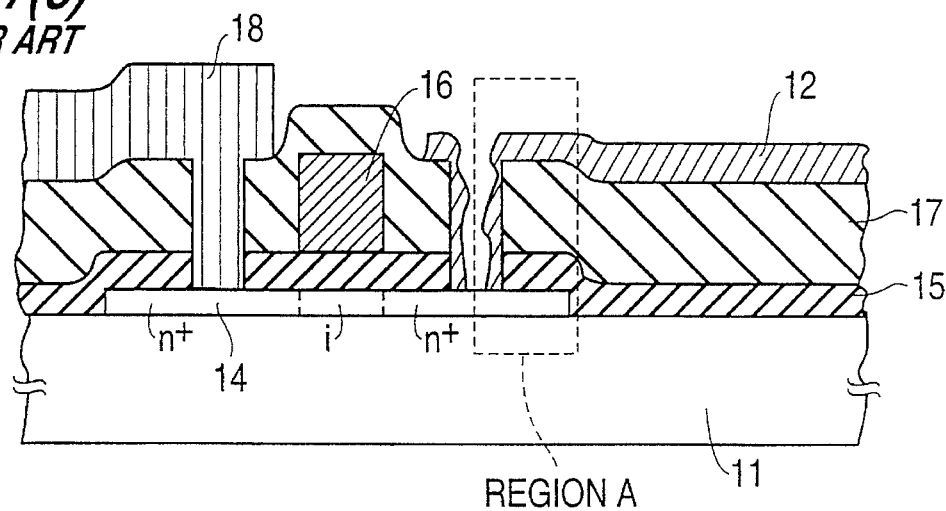

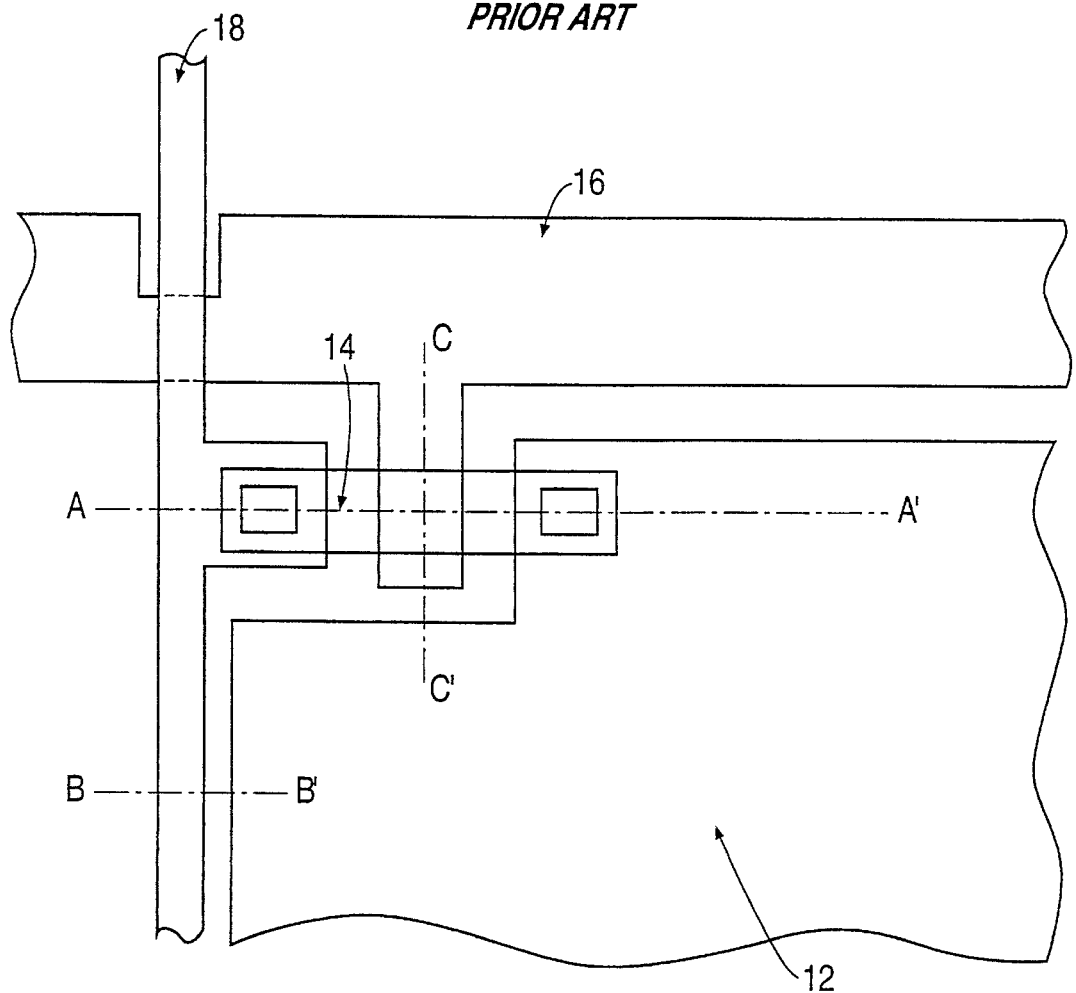

1

LIQUID-CRYSTAL DISPLAY TOP GATE THIN FILM TRANSISTOR WITH PARTICULAR CONNECTION BETWEEN THE DRAIN AND THE DISPLAY ELECTRODE

FIELD OF THE INVENTION

This invention relates to a thinfilm transistor array comprised of switching elements and display electrodes provided to drive a liquid-crystal display panel to be incorporated in a display device, its fabrication process thereof, and a liquid-crystal display device utilizing the same.

BACKGROUND OF THE INVENTION

A conventional fabrication process of a thinfilm transistor array is now explained below by taking an example for a case where it is used to fabricate a liquid-crystal display device.

FIG. 7 shows a fabrication process of top-gate type polysilicon thinfilm transistor array to be incorporated in an active matrix type liquid-crystal display device. As shown in FIG. 7(a), polysilicon thinfilm 14 is disposed on transparent substrate 11 first, and said polysilicon thinfilm 14 is formed into a thinfilm transistor array.

After disposing gate-insulation layer 15 of a silicon-oxide thinfilm on polysilicon thinfilm 14, gate electrode 16 is formed on gate-insulation layer 15. A phosphor dopant is then implanted in source and drain regions of thinfilm transistor array by using an ion-implantation method wherein said dopant is implanted into polysilicon thinfilm 14 through gate-insulation layer 15 by using gate electrodes 16 as a mask. After applying a process to activate said implanted dopant, silicon-oxide inter-insulation layer 17 is then formed as shown in FIG. 7(b).

After this, contact holes 20 are provided in gate insulation layer 15 and inter-insulation layer 17 formed on said source and drain regions of thinfilm transistor, and, as shown in FIG. 7(c), display electrodes 12 made of ITO (Indium Tin Oxide) are disposed on these. The fabrication process of thinfilm transistor array is completed then by depositing data wiring 18 on these.

Succeeding to the above, problems associated with the conventional fabrication process of thinfilm transistor array shown in FIG. 7 are now explained in the following.

The first problem is a high probability of disconnections of display electrodes 12.

FIG. 8 shows an enlargement of region-A of contact hole 20 shown in FIG. 7(c), indicating an edge step of which height corresponds to the sum of the thicknesses of gate insulation layer 15 and inter-insulation layer 17.

As shown in FIG. 8, since the height of step of contact hole is 500 nm (sum of 100 nm of gate insulation layer and 400 nm of inter-insulation layer) while the thickness of ITO layer of display electrode 12 is 100 nm, the step coverage of ITO layer at the contact hole step is inadequate, increasing the probabilities of disconnections and other troubles.

In preventing the disconnections of display electrodes 12 at contact holes, the inadequate step coverage had been corrected by providing a tapered cross-section of gate insulation layer 15 and inter-insulation layer 17 obtained by applying a controlled etching process in forming contact holes 20.

The second problem relates to short-circuits between the display electrode 12 and the data wiring 18.

2

FIG. 9 shows a top view of thinfilm transistor array designed to be incorporated in a liquid-crystal display device shown in FIG. 7. This cross-section at A–A' line shown in FIG. 9 corresponds to the one shown in FIG. 7(c).

As seen from the data wiring 18 and display electrode 12 disposed at a close distance shown by B–B' line in FIG. 9 and the cross-section of these components at B–B' line in FIG. 4(a), no insulation layer had been provided between the data wiring 18 and the display electrode 12 of conventional thinfilm transistor array.

Therefore, the probability of short-circuits between the data wiring 18 and the display electrode 12 due to foreign particles introduced there-between during the patterning process of these should had been fairly high.

Since the probability of such short-circuits is higher for the shorter distance between the data wiring 18 and the display electrode 12, a proper distance had to be provided in order to reduce the probability of such, sacrificing the display area as a result of this.

The third problem relates to corrosion of said circuit components possible during the patterning process of these.

During the patterning process of data wiring 18 made of an aluminum layer, corrosion of the aluminum layer may take place during the photolithographic process employing a positive type photoresist since the aluminum layer and the ITO layer of display electrode 12 are disposed on a common plane.

Thus, a negative type photoresist had to be employed particularly during the patterning process of data wiring 18. As for the corrosion process of Al-ITO layer possible during said photolithographic process, the details of it are explained in Japanese Patent Application Hei-5-1111439.

SUMMARY OF THE INVENTION

One of the objects of the present invention is to offer a thinfilm transistor array of higher reliabilities together with a new fabrication process of higher production yield solving the problems including the short-circuits between the data wiring and the display electrode. Moreover, the present invention is to offer a new liquid-crystal display device of higher aperture, yielding an improved display image quality attained by employing the invented thinfilm transistor array.

In order to attain these objectives, the invented top gate type thinfilm transistor array of which semiconductor active layer is made of a polysilicon thinfilm, is provided with display electrodes disposed between the gate insulation layer and the inter-insulation layer, and said display electrodes are connected to the drains of thinfilm transistors through data wiring disposed through contact holes provided on said inter-insulation layer.

Moreover, the display electrodes of the present invention are disposed between the first inter-insulation layer disposed on said gate insulation layer and gate electrodes and said second inter-insulation layer disposed above the first inter-insulation layer, and said display electrodes are connected to the drains of thinfilm transistors through the gate insulation layer disposed on the drain regions of thinfilm transistors and the data wiring connecting the contact holes provided in the first and the second inter-insulation layers.

Furthermore, the fabrication process of the present invention consists of a process to deposit a polysilicon thinfilm on a transparent substrate and to fabricate said thinfilm into a desired transistor pattern, a process to deposit a gate insulation layer cover said polysilicon thinfilm, a process to deposit gate electrodes on said gate insulation layer, a process to form source and drain regions of thinfilm transistors by implanting a dopant into said polysilicon thinfilm using said gate electrodes as a mask, a process to form display electrodes made of conductive oxide thinfilm on said gate insulation layer, a process to deposit an inter-insulation layer on said display electrodes, a process to form contact holes on each of the inter-insulation layer deposited on said source and drain regions of thinfilm transistor, and specified parts of said inter-insulator layer of said display electrodes, and a last process to deposit a protection layer on at least the entire surface of thinfilm transistors disposed within the thinfilm transistor array.

Moreover, in the invented fabrication processes, at least a silicon oxide layer or a silicon nitride layer is used as an inter-insulation layer, and at least a silicon nitride layer is used as a protection layer disposed on the entire surface of said thinfilm transistor for as a protection layer disposed on the surface of said display electrode.

Furthermore, the fabrication process of the present invention consists of a process to fabricate a polysilicon thinfilm on a transparent substrate and to fabricate said thinfilm into a desired form of transistor, a process to deposit a gate insulation layer covering said polysilicon thinfilm, a process to deposit gate electrodes on said gate insulation layer, a process to implant a dopant into said polysilicon thinfilm using said gate electrodes as a mask in order to form source and drain regions of thinfilm transistors, a process to deposit a first inter-insulation layer covering said gate electrodes, a process to deposit display electrodes made of conductive oxide on said first inter-insulation layer, a process to deposit a second Inter-insulation layer covering said display electrodes, a process to form contact holes on specified parts of said second inter-insulation layer deposited on said display electrode, and through said gate inter-insulation layer, the first inter-insulation layer, and second inter-insulation layer deposited on said source and drain regions of thinfilm transistors, a process to deposit a data wiring on said source and drain regions of thinfilm transistors, and a last process to deposit a protection layer on at least the entire surface of thinfilm transistors disposed within the thinfilm transistor array.

Moreover, in the invented fabrication process, at least a silicon oxide layer or silicon nitride layer is used as said first and second inter-insulation layers, and at least a silicon nitride layer is used as a protection layer deposited on the entire surface of said thinfilm transistors or as a protection layer deposited on the surface of said display electrodes.

Furthermore, the present invention offers a liquid-crystal display device comprised of a pair of transparent substrates filled with liquid crystal and a thinfilm transistor array of the invention deposited on one of said transparent substrates by which said liquid crystal elements are switched through said display electrodes of said thinfilm transistor array displaying images and characters on said liquid-crystal display device.

Therefore, according to the construction of the invented thinfilm transistor array, the disconnections and other failures possible at the junctions between the display electrodes (made of a conductive oxide layer) and the thinfilm transistors can be effectively prevented, and the possibilities of short-circuits (appeared as defective images) due to foreign particles introduced during its fabrication processes can also be largely reduced because the display electrodes and the data wiring of thinfilm transistors are insulated and isolated by, said first inter-insulation layer.

Thus, it is possible to employ a shorter distance between the data wiring and the display electrodes of thinfilm transistor than that of conventional thinfilm transistor, so that the aperture of display area of thinfilm transistor array can be considerably increased, and these are highly effective to improve the quality of displayed images.

BRIEF DESCRIPTION OF THE DRAWINGS

FIG. 3 shows a partial planar view of an invented thinfilm transistor array showing its structure when it is incorporated in a liquid crystal device.

FIG. 4(a) shows a construction of conventional thinfilm transistor array shown in FIG. 7(c), FIG. 4(b) shows a construction of thinfilm transistor array which is the first embodiment of the invention shown in FIG. 1(c), and FIG. 4(c) shows a construction of thinfilm transistor array which is the second embodiment of the invention shown in FIG. 2(c).

FIG. 5 is a cross-section of thinfilm transistor array sectioned along the C—C' line shown in FIGS. 3 and 9.

FIGS. 7(a), 7(b), and 7(c) show a cross section of a conventional thinfilm transistor array during its fabrication;

FIG. 9 is a partial planar view of conventional thinfilm transistor array showing its construction.

DESCRIPTION OF PREFERRED EMBODIMENTS

An embodiment of the present invention is now explained below by taking an example for fabrication processes of a thinfilm transistor array to be incorporated in an active matrix type liquid-crystal display device. In the below-shown description of this embodiment of the invention, the electrode of thinfilm transistor at the display electrode side is defined as a drain electrode.

EMBODIMENT-1

FIG. 1 shows cross-sectional fabrication processes of thinfilm transistor array which is a first embodiment of the invention.

Figure 1A:
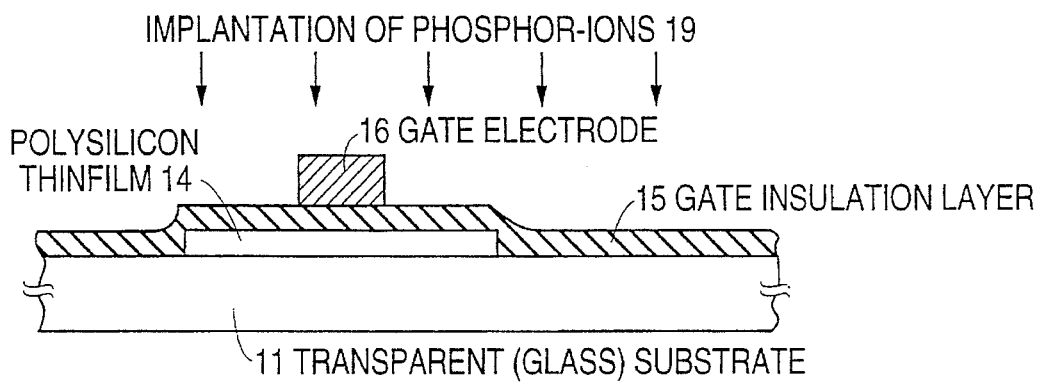
FIGS. 1(a), 1(b), and 1(c) show a construction of the thinfilm transistor which is a first embodiment of the invention, and cross-sections of its fabrication processes.

As shown in FIG. 1(a), polysilicon thinfilm 14 is deposited first on transparent substrate 11 of such as glass for a thickness of 100 nm. The deposition of polysilicon thinfilm is started with a deposition of amorphous silicon thinfilm using a plasma CVD device in which silane ($SiH_4$) gas and hydrogen ($H_2$) gas are introduced. Tile hydrogen concentration within the amorphous silicon thinfilm is then reduced by applying a heat-treatment in a nitrogen atmosphere kept at a temperature of 450° C. for a period of 120 minutes. By applying a irradiation of XeCl excimer laser (of a wavelength of 308 nm) onto the amorphous silicon thinfilm, said amorphous silicon thinfilm is transformed into polysilicon thinfilm 14.

By applying a patterning process, said polysilicon thinfilm 14 is made into a form of thinfilm transistor, and after this, gate insulation layer 15 of silicon oxide is deposited on said polysilicon thinfilm 14 for a thickness of 100 nm.

Gate electrodes 16 are then formed by depositing a tantalum (Ta) thinfilm for a thickness of 200 nm first on said gate insulation layer 15 and by removing an excess part of said tantalum thinfilm by means of chemical etching. Then, by implanting a phosphor ion into polysilicon thinfilm 14 through gate insulation layer 15 by using said gate electrodes 16 as a mask in order to form the source and drain regions of thinfilm transistor The phosphor-ion implantation is conducted under a condition employing an accelerating voltage of 80 kV in order to attain a total implantation concentration of $1 \times 10^{15} cm^2$. After this, the implanted dopant is activated by applying a heat-treatment in a nitrogen atmosphere kept at a temperature of 600° C. for a period of 24 hours.

Figure 1B:
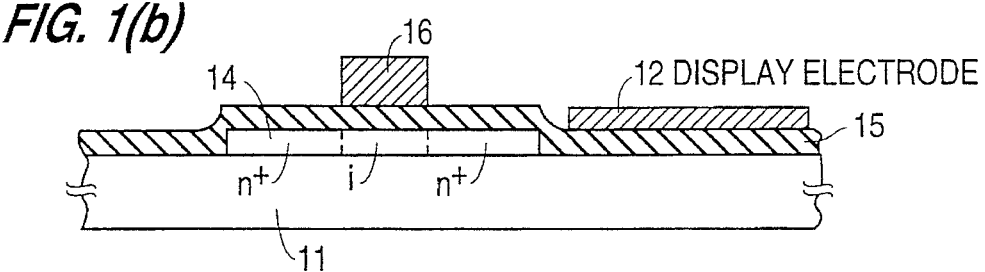

As shown in FIG. 1(b), a layer of display electrode 12 of a conductive oxide layer (ITO layer) is then deposited on gate insulation layer 15 for a thickness of 100 nm. After depositing inter-insulation layer 17 of a silicon oxide thinfilm on the entire surface of thinfilm transistors and display electrodes 12 for a thickness of 400 mm, the substrate is subjected to a hydrogen plasma treatment in order to terminate the dangling bonds existing in polysilicon thinfilm 14 at a high concentration.

Figure 1C:
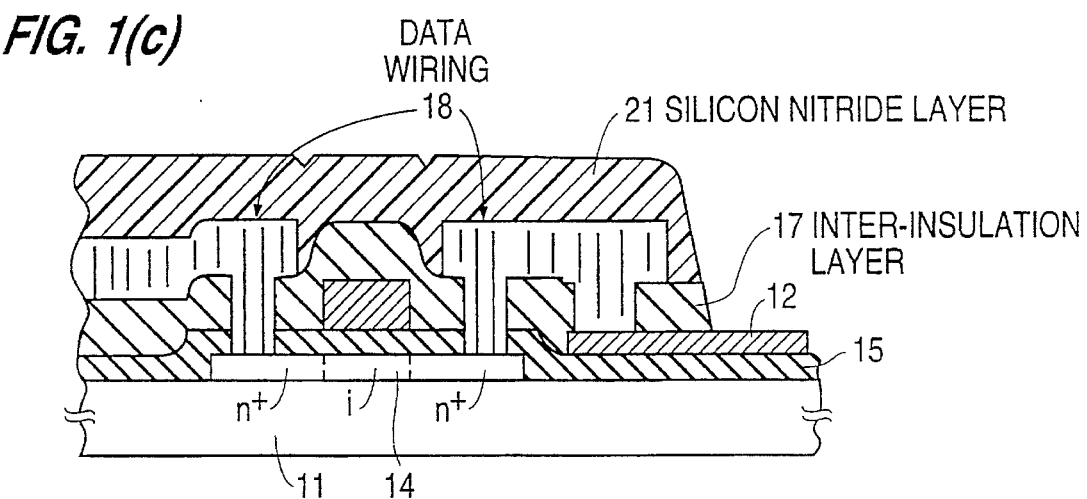

Said hydrogen plasma treatment is performed by using a parallel plate type plasma CVD device under a condition of hydrogen gas pressure of 1 Torr, RF power of 300 W, substrate temperature of 300° C. and a treatment period of 2 hours. After the hydrogen plasma treatment, contact holes are provided in the gate insulation layer 15 and inter-insulation layer 17 as shown in FIG. 1(c).

Then, electrical connections to each of the source and drain regions and the display electrodes are made by depositing data wiring 18 of an aluminum thinfilm for a thickness of 700 nm, and the fabrication processes of said thinfilm transistor array constituting the display pixels are completed by a deposition of protection layer 21 of silicon nitride on at least the entire surface of thinfilm transistors for a thickness of 500 nm. In addition to this, it is possible to provide protection layer 21 on the surface of display electrode 12 when a change of display characteristics of liquid crystal display device is desired.

EMBODIMENT-2

FIG. 2 shows stepwise cross-sectional fabrication processes of thinfilm transistor array in a second embodiment of the invention.

Figure 2A:
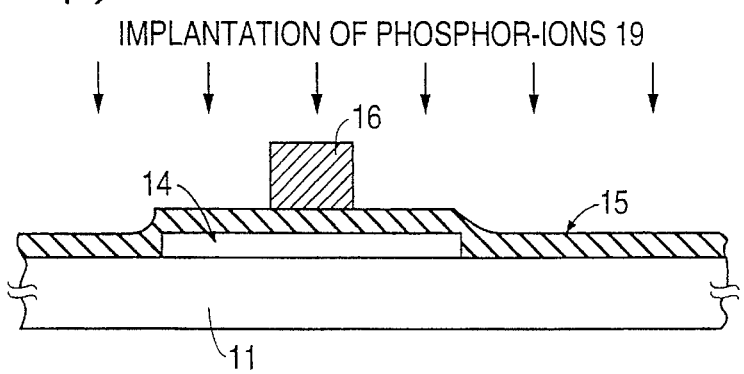
FIGS. 2(a), 2(b), and 2(c) show a construction of the thinfilm transistor which is a second embodiment of the invention, and cross-sections of its fabrication processes.

As shown FIG. 2(a), polysilicon thinfilm 14 is deposited first on transparent substrate 11 for a thickness of 100 nm. For this, an amorphous silicon thinfilm is deposited by using a low-pressure CVD device in which silane ($SiH_4$) and hydrogen ($H_2$) gases are introduced setting the substrate temperature at 550° C.

Said amorphous silicon thinfilm is then crystallized into polysilicon thinfilm 14 by applying a heat-treatment in a nitrogen atmosphere keeping the substrate temperature at 600° C. for a period of 10 hours.

After applying a patterning process to transform said polysilicon thinfilm 14 into a form of thinfilm transistor, gate insulation layer 15 of silicon oxide is deposited on polysilicon thinfilm 14 for a thickness of 100 nm.

Gate electrodes 16 are then formed by depositing a tantalum (Ta) thinfilm for a thickness of 200 nm on gate-insulation layer 15 and by removing an excess part of said tantalum thinfilm by means of chemical etching. Then, by implanting a phosphor dopant into the polysilicon thinfilm 14 through gate-insulation layer 15 by using said gate electrodes 16 as a mask to form source and drain regions of thinfilm transistor.

The phosphor-ion implantation is conducted under a condition of an accelerating voltage of 80 kV to obtain a total concentration of $1 \times 10^{15} cm^2$. After this, the implanted dopant is activated by applying a heat-treatment in a nitrogen atmosphere kept at a temperature of 600° C. for a period of 24 hours.

Figure 2B:
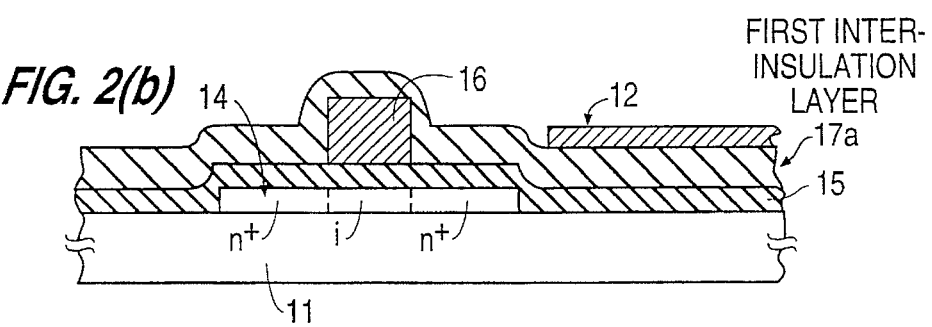

As shown in FIG. 2(b), display electrode 12 made of a conductive oxide thinfilm (ITO film) is deposited on a first inter-insulation film 17a of silicon oxide for a thickness of 300 nm. Then, a second inter-insulation layer 17b of silicon oxide is deposited for a thickness of 100 nm. After this, the substrate is subjected to a hydrogen plasma treatment in order to terminate the dangling bonds existed abundantly In polysilicon thinfilm 14.

Figure 2C:
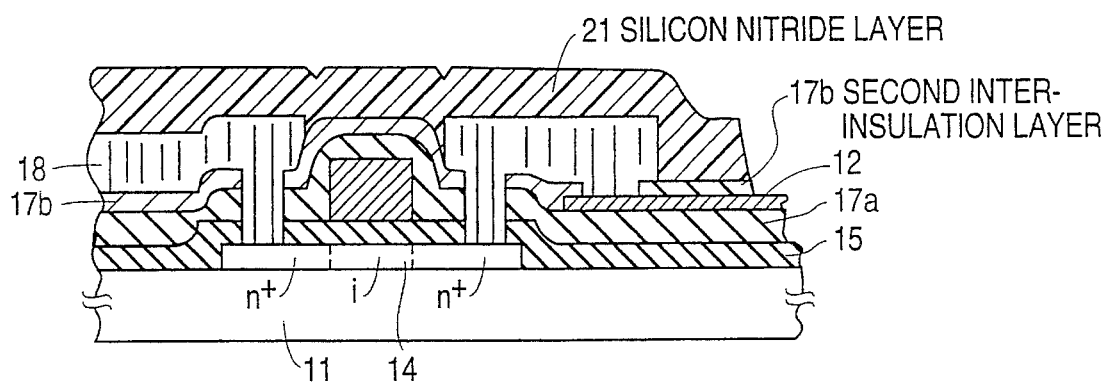

Said hydrogen plasma treatment is performed by using a parallel plate type plasma CVD device under a condition of hydrogen gas pressure of 1 Torr, RF power of 300 W, substrate temperature of 300° C. and a treatment period of 2 hours. After said hydrogen plasma treatment, contact holes are provided in gate insulation layer 15 and the first and the second inter-insulation layers 17a and 17b as shown in FIG. 2(c).

Then, electrical connections to each of the source and drain regions and to the display electrodes are made by depositing data wiring 18 of aluminum thinfilm for a thickness of 700 nm, and the fabrication process of thinfilm transistor array consisted of display pixels is completed by depositing protection layer 21 made of silicon nitride at least on the entire surface of thinfilm transistor array for a thickness of 500 nm. In addition to this, it is possible to deposit protection layer 21 on the surface of display electrode 12 when a change of display characteristics of liquid-crystal display device is desired.

Although the first and the second silicon-oxide inter-insulation layers 17a and 17b are employed in this second embodiment of the invention, the same effect can be obtained by using a thinfilm other than the silicon oxide thinfilm such as a silicon nitride thinfilm or a laminated thinfilm consisted of a silicon oxide thinfilm and a silicon nitride thinfilm.

As shown in the first and the second embodiments of the invention, the drain regions which had been directly connected to the display electrodes can now be connected through data wiring 18 when the invented fabrication method is employed. Thus, a substantial reduction of contact failures or disconnections can be realized together with a substantial improvement of production yield of thinfilm transistor array.

Figure 4A:
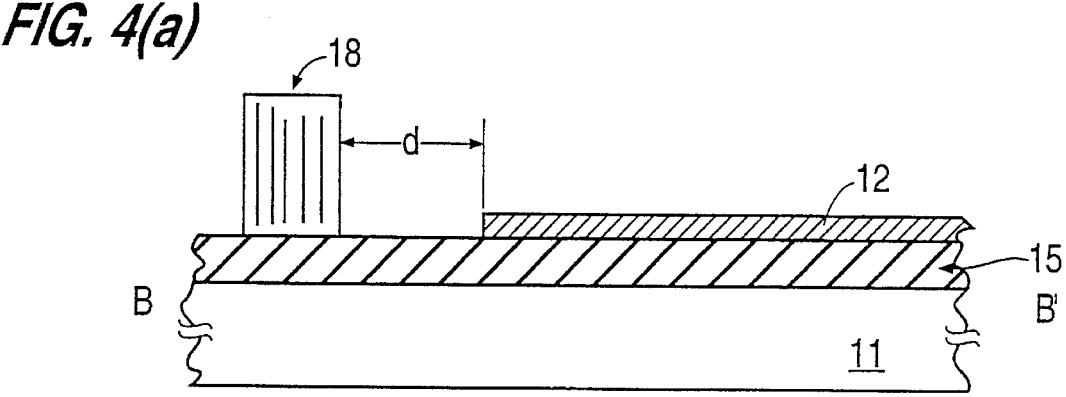
FIGS. 4(a), 4(b), and 4(c) show a cross-section of thinfilm transistor array sectioned along B—B' line shown in FIGS. 3 and 9.
Figure 4B:
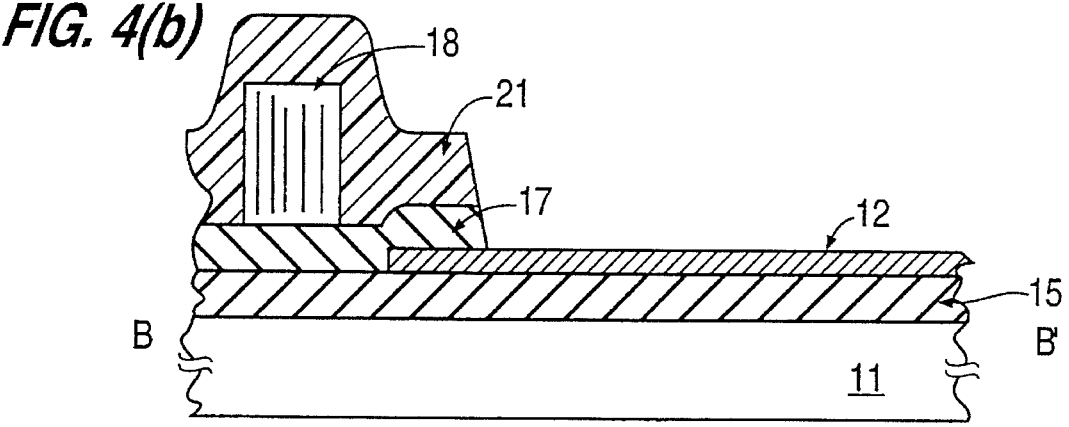
Figure 4C:
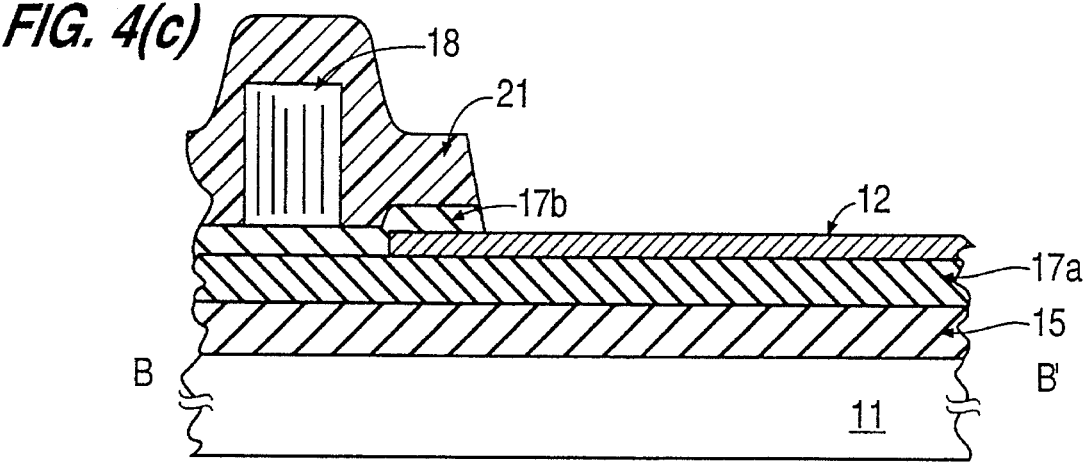

FIG. 3 shows a top view of liquid-crystal display device are employing the invented thinfilm transistor array, and FIG. 4 is a cross-sectional construction of it showing the relative positions of data wiring 18 and display electrodes 12 along the B—B' line of FIGS. 3 and 9.

Since the display electrodes 12 and data wiring 18 had been coplanarly disposed in the conventional case as shown In FIG. 4(a), a proper distance d had to be provided between the display electrode 12 and the data wiring 18 in order to reduce the short-circuits possible there-between.

In contrast to the conventional case shown in the above, inter-insulation layer 17 is disposed between the display electrode 12 and data wiring 18 of the invented thinfilm transistor array as shown in FIGS. 4(*b*) and 4(*c*). Since these two components can be insulated and isolated each other completely, the electrical shortage between a display electrode and a data wiring due to dusts introduced during the fabrication process can be largely reduced and the production yield of thinfilm transistor array can be improved substantially.

Figure 5A:
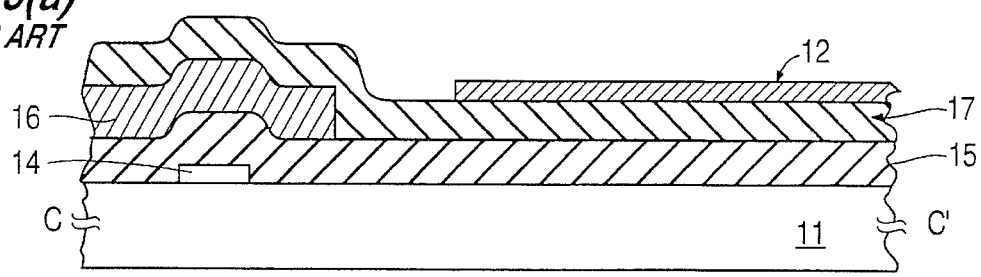
FIG. 5(a) shows a construction of conventional thinfilm transistor array shown in FIG. 7(c)
Figure 5B:
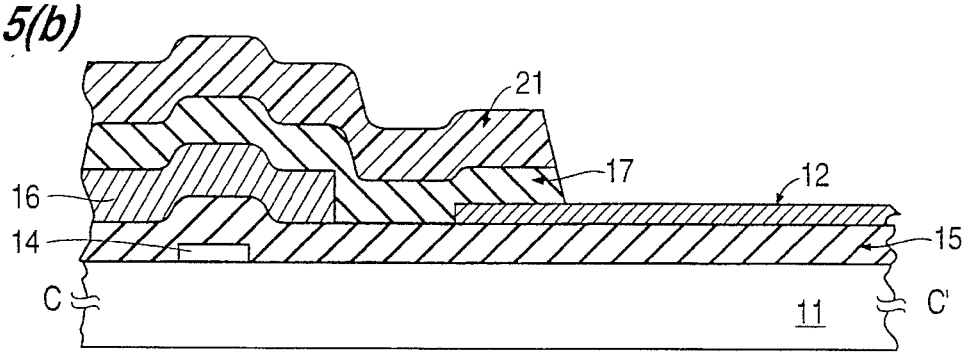
FIG. 5(b) shows a construction of thinfilm transistor array which is the first embodiment of the invention shown in FIG. 1(c)
Figure 5C:
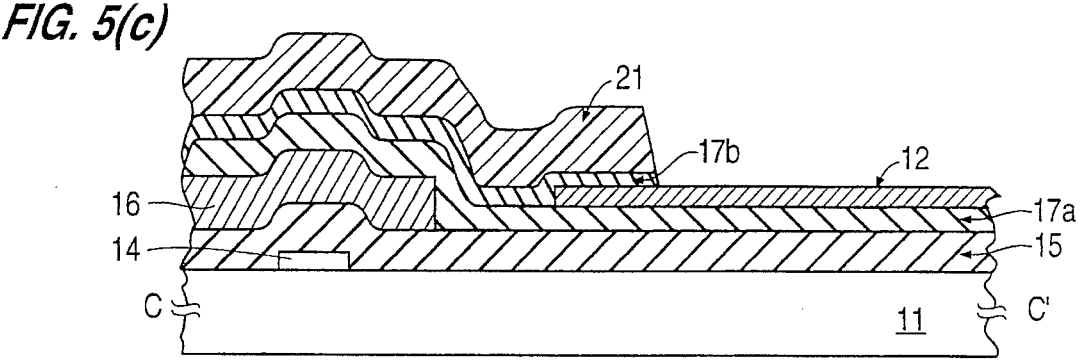
FIG. 5(c) shows a construction of thinfilm transistor array which is the second embodiment of the invention shown in FIG. 2(c).

FIG. 5 shows a cross-section at C—C' line specified in FIGS. 3 and 9 showing relative positions of gate electrode 16 and display electrode 12 of thinfilm transistor array. As shown in the second embodiment of the invention, since the first inter-insulation layer 17a is provided between the gate electrode 16 and the display electrode 12, these two components are insulated and isolated each other. Thus, the electrical shortage between a display electrode and a data wiring due to dusts Introduced during its fabrication process can be reduced and the production yield of thinfilm transistor array can be improved substantially also.

Moreover, since the probability of short-circuits can be reduced to a reasonably low level by employing the invented fabrication process, the distance d between the data wiring 18 and the display electrode 12 can be designed at its minimum, improving the display area aperture of liquid-crystal display device and the contrast thereof also. Moreover, since data wiring 18 and display electrode 12 are insulated and isolated each other by means of inter-insulation layer, the possible erosion of aluminum wiring during the photolithographic process forming data wiring 18 can be eliminated.

EMBODIMENT-3

Figure 6:
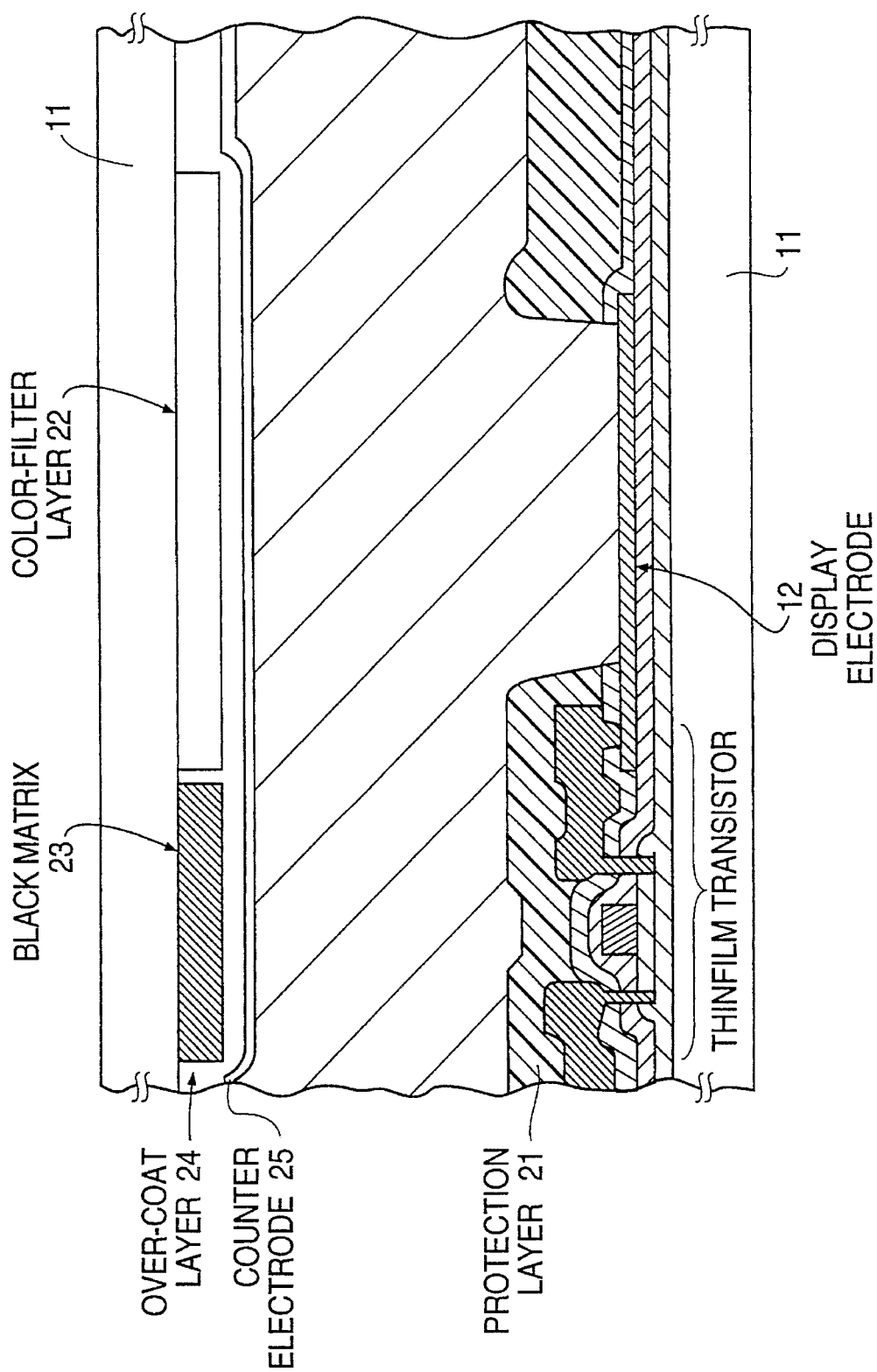
FIG. 6 is a cross-section of liquid-crystal display device using an invented thinfilm transistor array showing its construction.
Figure 8:
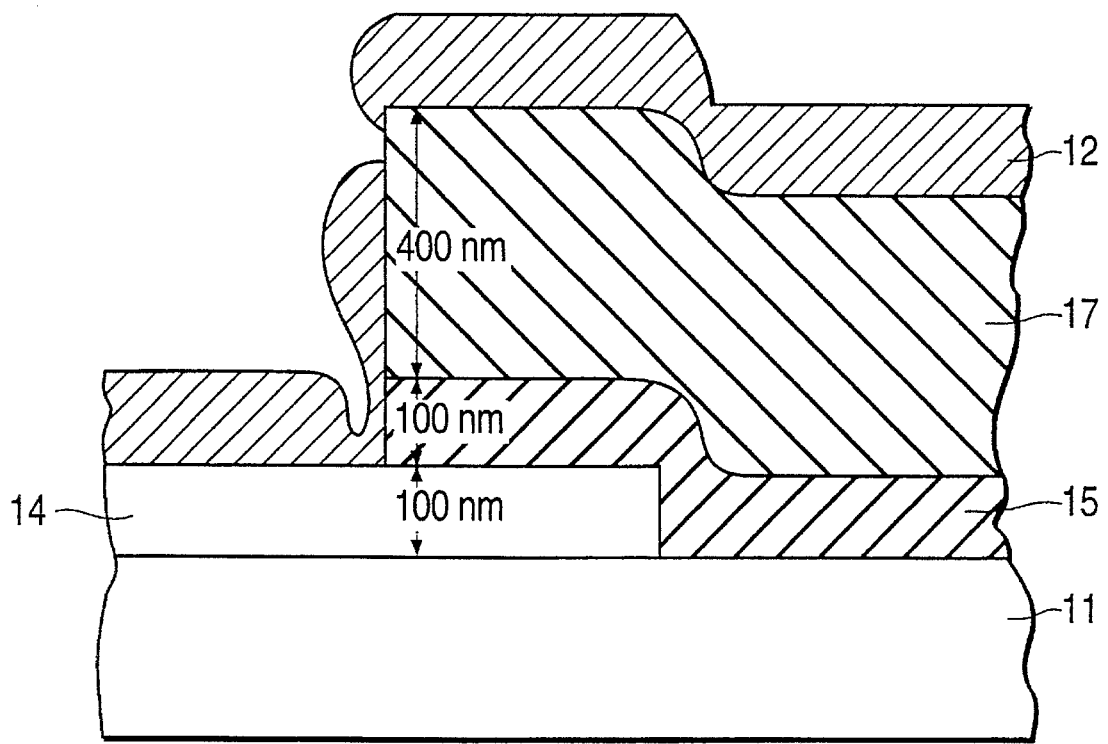
FIG. 8 is an enlargement of region-A shown in FIG. 7(c).

FIG. 6 shows a cross-section of unit pixel of liquid-crystal display device in which the invented thinfilm transistor array is incorporated. The liquid-crystal layer is sandwiched between two transparent glass substrates 11 constituting display cells.

In the cell, color filter layer 22 and black matrix 23 are disposed on the surface of one of the substrates and counter electrode 25 made of ITO thinfilm is deposited on over-coat layer 24, while a thinfilm transistor array is integrally disposed on the surface of the other substrate by using fabrication processes explained in Embodiment-1 or -2 of the invention. The protection layer on the display electrode is omitted in this case. Since the thinfilm transistor array is made of a polysilicon layer, the peripheral circuits driving the thinfilm transistor array can be constituted of polysilicon thinfilm transistors, and these are disposed at an outer rim of said transparent substrate 11.

As depicted in FIG. 6, a major portion of the protection layer, formed over the thinfilm transistor array, is omitted to expose the display electrode. The elimination of this portion of the protection layer achieves some clear advantages over the prior art. First, the elimination decreases the resistivity due to the protection layer, which on a transparent substrate and to fabricate said thinfilm.

What is claimed is:

1. A liquid-crystal display device comprised of display cells the device consisting of a pair of transparent substrates filled with liquid-crystal and a top-gate type thinfilm transistor array disposed on one of said transparent substrate, wherein images and/or characters can be displayed on said display cells by switching said liquid crystal by controlling display electrodes of said thinfilm transistor array, said display electrodes being disposed between a first insulation layer which is disposed on gate electrodes which are disposed on a gate insulation layer and a second insulation layer disposed on said first insulation layer, said display electrodes being connected to drain regions of said thinfilm transistors with a data wiring through a contact hole disposed in said second insulation layer and through a contact hole disposed in said gate insulation layer, said first insulation layer and said second insulation layer formed on an upper side of said drain regions, and a protection layer being formed on said thinfilm transistor array, wherein a major part of said protection layer on said display electrode is omitted to expose said display electrode.

* * * * *